US011033843B2

(12) United States Patent
Sutherland et al.

(10) Patent No.: US 11,033,843 B2
(45) Date of Patent: Jun. 15, 2021

(54) PRESS-IN FILTER SPUD THAT IS FREE TO SPIN

(71) Applicant: Parker-Hannifin Corporation, Cleveland, OH (US)

(72) Inventors: Russell A. Sutherland, Modesto, CA (US); Bradley W. Harbur, Modesto, CA (US)

(73) Assignee: Parker-Hannifin Corporation, Cleveland, OH (US)

(*) Notice: Subject to any disclaimer, the term of this patent is extended or adjusted under 35 U.S.C. 154(b) by 0 days.

(21) Appl. No.: 16/885,020

(22) Filed: May 27, 2020

(65) Prior Publication Data

US 2020/0282349 A1  Sep. 10, 2020

Related U.S. Application Data

(63) Continuation of application No. PCT/US2018/063329, filed on Nov. 30, 2018.

(Continued)

(51) Int. Cl.
*B01D 35/30* (2006.01)
*B01D 27/08* (2006.01)

(52) U.S. Cl.
CPC .......... *B01D 35/306* (2013.01); *B01D 27/08* (2013.01); *B01D 2201/291* (2013.01);
(Continued)

(58) Field of Classification Search
CPC ............ B01D 35/306; B01D 2201/291; B01D 2201/347; B01D 2201/4023; B01D 2201/4061; B01D 2201/4076; B01D 2201/4092; B01D 27/08; B01D 2201/4053; B01D 27/00
See application file for complete search history.

(56) References Cited

U.S. PATENT DOCUMENTS 2,418,777 A    4/1947 Le Clair
3,859,216 A *  1/1975 Sisson .................. B01D 27/103
                                              210/440

(Continued)

FOREIGN PATENT DOCUMENTS

DE    19718603 A1    11/1997
DE    10052524 A1    4/2002

(Continued)

OTHER PUBLICATIONS

U.S. Appl. No. 62/417,722, filed Nov. 4, 2016, Decoster et al.

*Primary Examiner* — Benjamin M Kurtz
(74) *Attorney, Agent, or Firm* — Reinhart Boerner Van Deuren P.C.

(57) ABSTRACT

A filter element, filter head, a filter system and methods of assembling or mounting a filter element to a filter head are provided. The filter element and filter head have cooperating axially undulating sealing regions. The filter head has a spud that has a non-cylindrical region that extends through a non-circular opening in the filter element to communicate a central bore of the spud with a central cavity defined by filter media of the filter element. The method includes angularly aligning the undulating sealing regions by inserting the non-cylindrical region of the spud through the non-circular opening of the filter element.

7 Claims, 9 Drawing Sheets

Related U.S. Application Data (60) Provisional application No. 62/594,419, filed on Dec. 4, 2017.

(52) U.S. Cl.
CPC .......... *B01D 2201/347* (2013.01); *B01D 2201/4023* (2013.01); *B01D 2201/4092* (2013.01)

(56) References Cited

U.S. PATENT DOCUMENTS

| | | |
|---|---|---|
| 4,786,409 A | 11/1988 | Miller |
| 5,171,043 A | 12/1992 | Ronda et al. |
| 5,302,284 A | 4/1994 | Zeiner et al. |
| 5,851,269 A | 12/1998 | Strope |
| 6,283,305 B1 | 9/2001 | Maeda et al. |
| 6,312,491 B2 | 11/2001 | Coulonvaux |
| 6,554,139 B1 | 4/2003 | Maxwell et al. |
| 6,675,995 B2 | 1/2004 | Stull et al. |
| 6,797,168 B1 | 9/2004 | Knight |
| 6,936,084 B2 | 8/2005 | Schlensker et al. |
| 6,949,189 B2 | 9/2005 | Bassett et al. |
| 7,147,110 B2 | 12/2006 | Clausen et al. |
| 7,494,017 B2 | 2/2009 | Miller |
| 7,540,956 B1 | 6/2009 | Kurth et al. |
| 8,361,181 B2 | 1/2013 | Osendorf et al. |
| 8,603,334 B2 | 12/2013 | Stamey, Jr. et al. |
| 8,828,123 B2 | 9/2014 | Holzmann et al. |
| 8,916,044 B2 | 12/2014 | Rapin |
| 9,599,077 B2 | 3/2017 | Jensen |
| 2003/0038088 A1 | 2/2003 | Denys et al. |
| 2004/0103626 A1 | 6/2004 | Warth et al. |
| 2007/0084170 A1 | 4/2007 | Ehrenberg |
| 2008/0142426 A1 | 6/2008 | Greco et al. |
| 2008/0237113 A1 | 10/2008 | Jensen |
| 2009/0230051 A1 | 9/2009 | Holmes et al. |
| 2010/0025317 A1 | 2/2010 | Fall et al. |
| 2010/0064646 A1 | 3/2010 | Smith et al. |
| 2012/0067014 A1 | 3/2012 | Dhiman et al. |
| 2012/0180750 A1* | 7/2012 | Thienel .......... B01D 27/08 123/196 A |
| 2012/0181224 A1 | 7/2012 | Rapin |
| 2013/0043176 A1 | 2/2013 | Johnson et al. |
| 2013/0043181 A1 | 2/2013 | Krull |
| 2013/0043281 A1 | 2/2013 | Hsu et al. |
| 2014/0102060 A1 | 4/2014 | Kato et al. |
| 2014/0137525 A1 | 5/2014 | Cambpell et al. |
| 2014/0165834 A1 | 6/2014 | Kaufmann et al. |
| 2015/0096931 A1 | 4/2015 | Jensen |
| 2015/0101295 A1 | 4/2015 | Thompson et al. |
| 2018/0318745 A1 | 11/2018 | Nichols et al. |
| 2018/0372036 A1 | 12/2018 | Von Seggern et al. |

FOREIGN PATENT DOCUMENTS

| | | |
|---|---|---|
| DE | 10 2009 021512 A1 | 11/2010 |
| DE | 10 2016 002 954 A1 | 9/2016 |
| EP | 2 570 171 A2 | 3/2013 |
| JP | 2000510038 A | 8/2000 |
| WO | WO 2005/068047 A1 | 7/2005 |
| WO | WO 2006/012031 A1 | 2/2006 |
| WO | WO 2009/012010 A1 | 1/2009 |
| WO | WO 2010/011628 A2 | 1/2010 |
| WO | WO 2010/117799 A2 | 10/2010 |
| WO | WO 2014/078796 A2 | 5/2014 |
| WO | WO 2018/111434 A2 | 6/2018 |

* cited by examiner

PRESS-IN FILTER SPUD THAT IS FREE TO SPIN

CROSS-REFERENCE TO RELATED PATENT APPLICATIONS

This patent application is a continuation of co-pending International Application No. PCT/US2018/063329, filed Nov. 30, 2018, which is now pending. This patent application claims the benefit of U.S. Provisional Patent Application No. 62/594,419, filed Dec. 4, 2017, the entire teachings and disclosure of which are incorporated herein by reference thereto.

FIELD OF THE INVENTION

This invention generally relates to filter elements, filter systems, the interface between the filter element and a filter head of a filter system as well as methods of mounting filter elements to a filter head.

BACKGROUND OF THE INVENTION

Filter systems are used to filter fluids to prevent damage or reduction in performance of downstream systems. Many filter systems include a filter head to which one or more replaceable filter elements are mounted. Once the filter element is spent (e.g. a filter media thereof is full of impurities), the filter element can be removed and replaced without having to replace the entire filter system.

One particular type of filter system uses filter elements that are referred to as spin-on filters. The filter system includes a filter head to which the replaceable filter element threadedly attaches. Thus, the filter element must be spun on to be attached to the filter head during replacement intervals.

The filter head will typically include inlet and outlet ports which direct fluid into and out of the filter element. The fluid passes through the filter element, which separates particles and other contaminants from the fluid which is then sent to a downstream operating system. In order for the filter element to properly function and not leak, a positive seal must be maintained with the filter head. Typically, liquid filter elements use an O-ring supported along a plane in a straight cut or radial seal gland design. A sloped or angled seal gland design has been used, for example as shown in U.S. Pat. No. 7,494,017 for "Filter Element With Off-Axis End Cap", issued to the assignee of the present invention. Recently, a sealing interface that utilizes an undulating geometry has been developed by the assignee of the present application and is illustrated in U.S. Pat. No. 8,916,044 for "Filter Element Wave Gland Seal."

The invention provides improvements over the current state of the art and particularly the current state of the art as it relates to the inclusion of a sealing interface that includes an undulating geometry.

BRIEF SUMMARY OF THE INVENTION

Embodiments of the present invention provide new and improved filter elements, filter heads, filter systems and methods of assembling filter systems or mounting a filter element to a filter head.

In a particular embodiment, a spin-on filter element including an outer housing and an element sub assembly is provided. The filter housing includes an outer shell and a threaded attachment member. The threaded attachment member is secured to the outer shell. The threaded attachment member includes a mounting thread that defines a rotational axis. The threaded attachment member and outer shell define an internal shell cavity. The element subassembly is secured within the internal shell cavity. The element subassembly includes a tubular ring of filter media and a first end cap. The tubular ring of filter media extends between first and second ends and surrounds an internal media cavity. A central opening extends through the first end cap in fluid communication with the internal media cavity. The central opening defines a non-circular periphery. A seal member is attached to the first end cap and surrounds the central opening of the first end cap. The seal member has an axially undulating and radially facing sealing region.

In one embodiment, the threaded attachment member is angularly fixed to the outer shell to a greater degree than the element subassembly. Thus, the subassembly will rotate under less torque than the threaded attachment member.

In one embodiment, the element subassembly is rotatable within the outer housing.

In one embodiment, a greater torque is required to rotate the threaded attachment member relative to the outer shell about the rotational axis than is required to rotate the element subassembly relative to the threaded attachment member.

In one embodiment, the periphery of the central opening has a length that is greater than a width thereof. The length is perpendicular to the width.

In one embodiment, the seal member defines the central opening.

In one embodiment, the end cap defines the central opening.

In one embodiment, the central opening is recessed axially into the outer shell farther than the axially undulating and radially facing sealing region.

In a further embodiment, a filter system is provided. The filter system includes a filter head and a spin-on filter element. The filter element may be one as described above. The filter head includes a first port and a second port. The filter head includes a threaded filter mounting interface that includes a mounting thread. The filter head includes an axially extending spud. The spud has a bore therethrough in operable fluid communication with the first port. The spud has a first axially extending portion defining a non-cylindrical outer surface. The spud has a second axially extending portion defining a first axially undulating and radially facing sealing region. The second axially extending portion is axially offset from the first axially extending portion. The first axially undulating and radially facing sealing region of the filter head engages the axially undulating and radially facing sealing region of the spin-on filter element. The threaded attachment member threadedly engages the threaded filter mounting interface. The first axially extending portion of the spud extends through the central opening of the element subassembly with the bore of the spud in fluid communication with the internal media cavity. Thus, the port is operably in fluid communication with the cavity of the filter media.

In one embodiment, the non-cylindrical outer surface of the first axially extending portion has an outer profile that corresponds to the non-circular periphery of the central opening such that the spud angularly engages the element subassembly and a torque is transferred between the spud and the element subassembly as the spin-on filter element is threadedly mounted to the threaded filter mounting interface.

In one embodiment, the spud is rotatably mounted to rotate with the spin-on filter element as the threaded attachment member is rotatably mounted to the threaded filter mounting interface with the spud extending into the central opening.

In one embodiment, the element subassembly is rotatably carried within the outer housing. As such, with the spud engaged with the central opening, the element subassembly is rotated within the outer housing as the spin-on filter element is mounted to the threaded filter mounting interface.

In one embodiment, the mounting thread of the threaded filter mounting interface is axially spaced relative to the first axially extending portion of the spud a first distance and the mounting thread of the threaded attachment member is axially spaced relative to the central opening of the element subassembly a second distance less than the first distance such that the first axially extending portion of the spud extends into the central opening before the mounting thread of the filter head engages the mounting thread of the spin-on filter element during installation.

In one embodiment, the non-cylindrical outer surface of the spud cooperates with the non-circular periphery of the central opening such that insertion of the first axially extending portion of the spud into the central opening angularly aligns the first axially undulating and radially facing sealing region of the filter head with the axially undulating and radially facing sealing region of the spin-on filter element.

In one embodiment, the mounting thread of the threaded filter mounting interface is axially spaced relative to the first axially extending portion of the spud and the mounting thread of the threaded attachment member is axially spaced relative to the central opening of the element subassembly such that the first axially extending portion of the spud extends into the central opening before the mounting thread of the filter head engages the mounting thread of the spin-on filter element.

In an embodiment, a method of mounting a spin-on filter element to a filter head is provided. The filter head and the filter element may be according to those outlined above. The method includes angularly aligning the first axially undulating and radially facing sealing region of the filter head with the axially undulating and radially facing sealing region of the spin-on filter element by inserting the first axially extending portion of the spud into the central opening with the non-cylindrical outer periphery angularly oriented with the non-circular periphery of the central opening. The method includes engaging the mounting thread of the spin-on filter element with the mounting thread of the filter head.

In one method, engaging the mounting thread of the spin-on filter element with the mounting thread of the filter head includes rotating the outer housing of the spin-on filter element relative to the threaded filter mounting interface. Additionally, rotating the outer housing rotates the spud relative to the threaded filter mounting interface.

In one method, engaging the mounting thread of the spin-on filter element with the mounting thread of the filter head includes rotating the outer housing of the spin-on filter element relative to the threaded filter mounting interface. Additionally, the method includes preventing rotation of the element subassembly relative to the threaded filter mounting interface during the step of engaging by angularly engaging the spud with the central opening. The spud is angularly fixed relative to the threaded filter mounting interface.

In one method, the spud is axially inserted into the central opening prior to the step of engaging the mounting thread of the spin-on filter element with the mounting thread of the filter head.

In one method, the method includes radially engaging the first axially undulating and radially facing sealing region of the filter head with the axially undulating and radially facing sealing region of the spin-on filter element to prevent fluid bypass between the spud and the seal member.

In one embodiment, a filter head is provided for use with a replaceable filter element. The filter head includes a body member, a threaded filter mounting interface and an axially extending spud. The body member includes a first port and a second port. The threaded filter mounting interface includes a mounting thread. The spud has a bore therethrough in operable fluid communication with the first port. The spud has a first axially extending portion defining a non-cylindrical outer surface. The spud has a second axially extending portion defining a first axially undulating and radially facing sealing region. The second axially extending portion is axially offset from the first axially extending portion.

In one embodiment, the spud is rotatably mounted to the filter body for rotation relative to the threaded filter mounting interface about an axis defined by the mounting thread.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
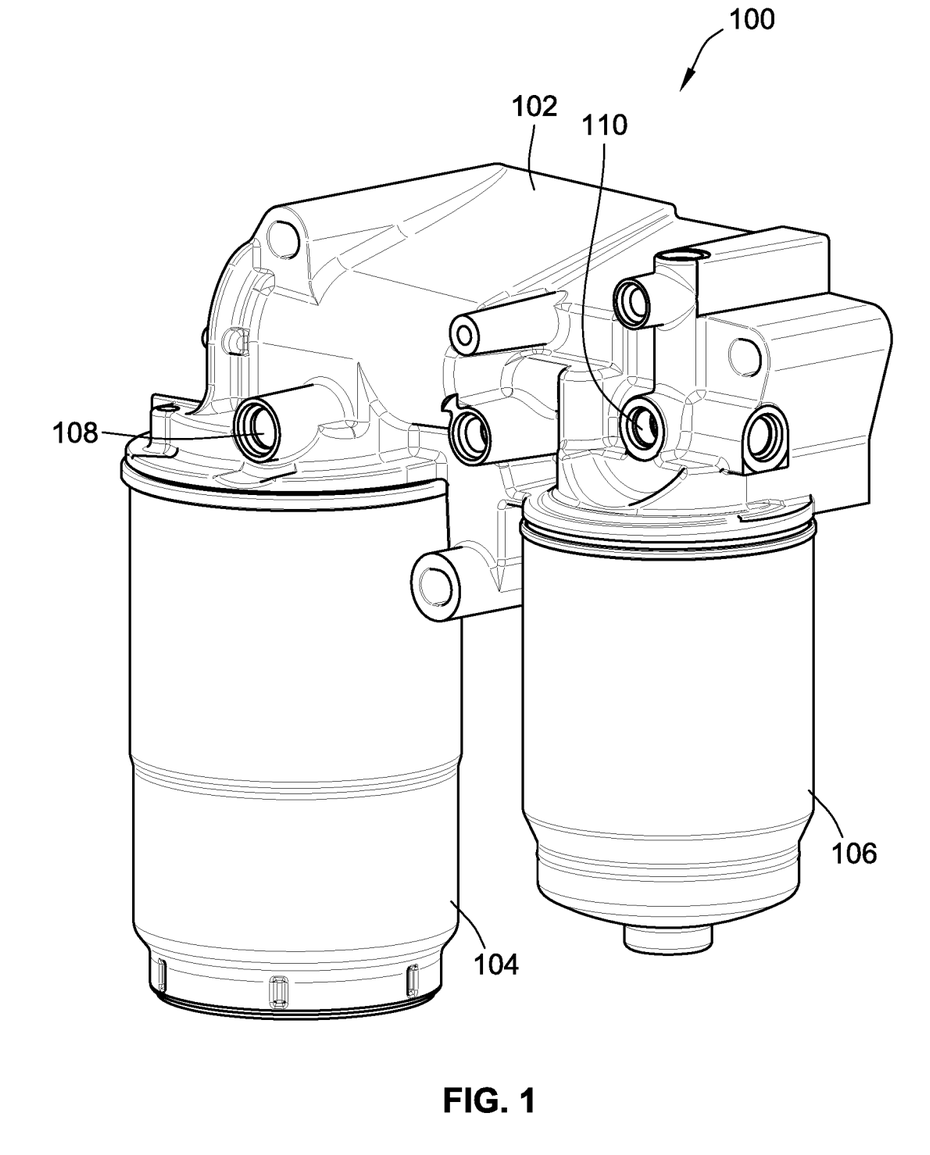
FIG. 1 is a perspective illustration of a filter system according to an embodiment of the invention including a filter head and primary and secondary filter elements.

FIG. 1 illustrates a filter system 100 for filtering fluids and particularly liquids. In one implementation, the filter system 100 filters fuel. The filter system 100 includes a filter head 102, a primary filter element 104, and a secondary filter element 106. While multiple filter elements are illustrated, embodiments of the invention may be practiced with more or less filter elements.

The filter head 102 includes a plurality of ports (dirty fluid inlet and clean fluid outlet ports 108, 110 are illustrated in FIG. 1) for connecting to fluid supplies and downstream systems such as for example an upstream fuel tank and a downstream engine. The dirty fluid inlet port 108 is upstream of the primary filter element 104 with the clean fluid outlet port 110 downstream of the secondary filter 106. Internal porting is provided between a clean side of the primary filter and a dirty side of the secondary filter. As such, the filter head 102 will typically provide a clean and a dirty port for each of the primary and secondary filter elements 104, 106.

The primary and secondary filter elements 104, 106 are spin-on filter elements that threadedly attach to the filter head 102.

Figure 2:
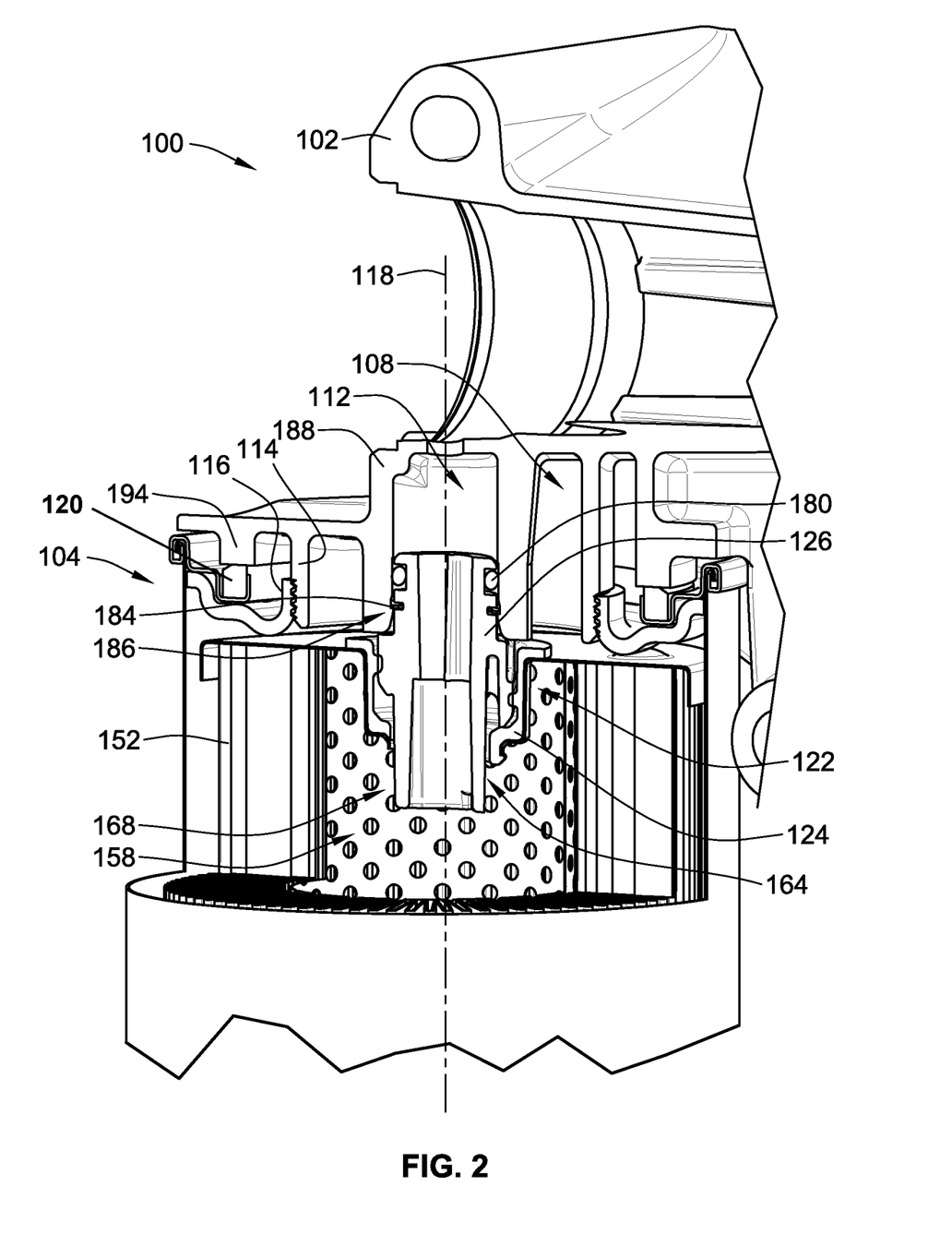
FIG. 2 is a cross-sectional illustration of the filter head and primary filter element of the filter system of FIG. 1.

FIG. 2 illustrates a portion of the filter system 100 in cross section and particularly a portion of the primary filter element 104. The dirty fluid inlet port 108 where dirty fluid enters the system and a clean fluid outlet port 112 where cleaned fluid that has passed through the primary filter element 104 are illustrated.

As noted, the primary filter element 104 is a spin-on filter element. As such, the filter head 102 includes a threaded filter mounting interface 114 that includes a plurality of helical mounting threads. The primary filter element 104 includes a corresponding threaded attachment interface in the form of a threaded attachment member 116 that is in the form of an attachment plate that includes a plurality of helical mounting threads. The threaded filter mounting interface 114 and threaded attachment member 116 define a rotational axis 118 about which the threaded attachment member 116 rotates as the primary filter element 104 is rotated to engage the cooperating threads and mount the primary filter element 104 to the filter head 102.

To prevent leakage of fluid passing through the filter system 100, a first housing seal 120 is provided between the filter head 102 and the primary filter element 104. The first housing seal 120 is an axial seal that is axially compressed between the primary filter element 104 and the filter head 102.

A second seal arrangement 122 is provided between the filter head 102 and the primary element 104. The second seal arrangement 122 is a provided by radial engagement between a seal member 124 of the primary filter element 104 and an axially extending spud 126 of the filter head 102.

Figure 3:
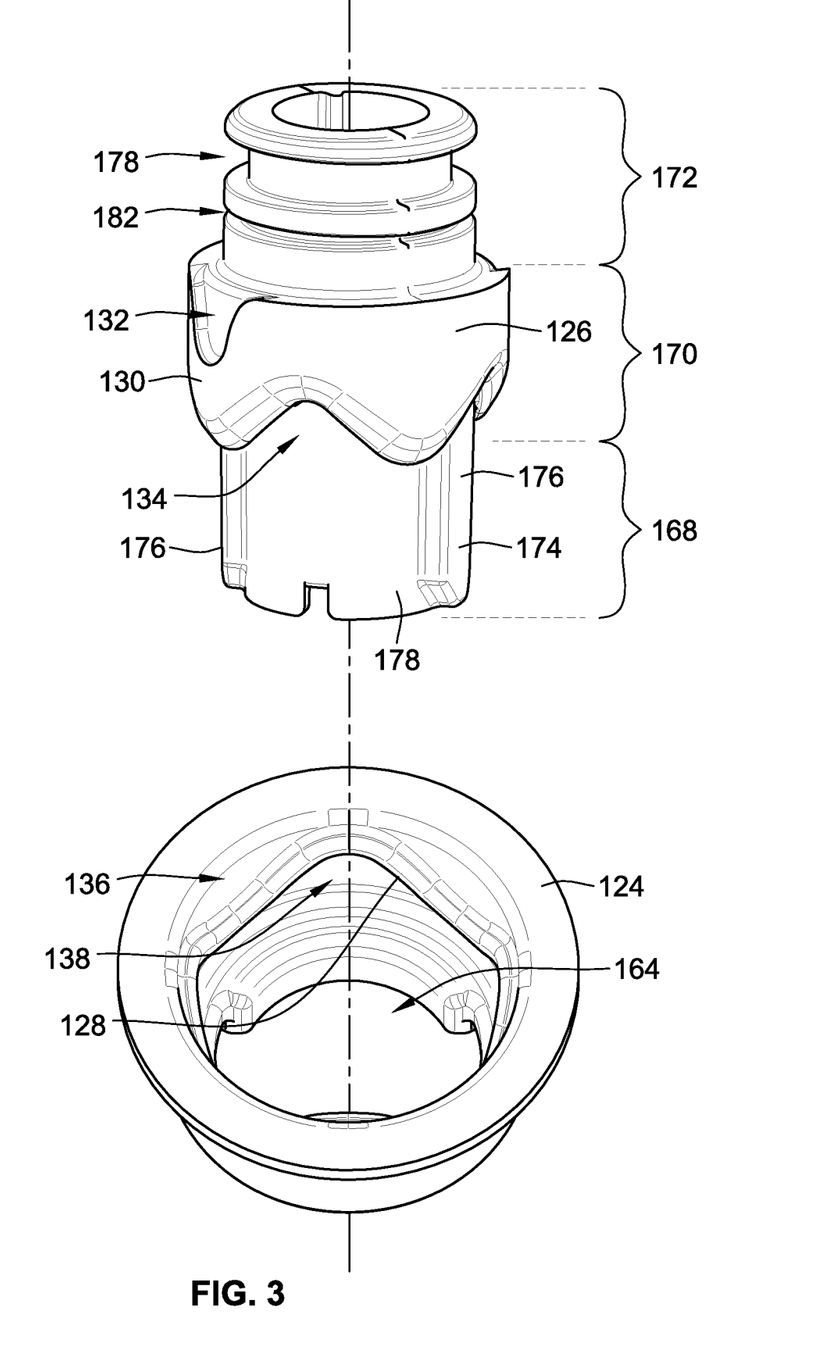
FIG. 3 is a partial exploded illustration of a mating seal member of the primary filter element and a spud of the filter head.

With additional reference to FIG. 3, the seal member 124 includes a first axially undulating and radially facing sealing region 128 (also referred to herein as "first sealing region 128") that faces radially inward. The spud 126 includes a corresponding second axially undulating and radially facing sealing region 130 (also referred to herein as "second sealing region 130") that faces radially outward and is sized and shaped to mate with the first axially undulating and radially facing sealing region 128. The first and second sealing regions radially engage one another to prevent fluid bypass between the seal member 124 and the spud 126. The radial and axial directions are taken with respect to the rotational axis 118.

Due to the various voids 132, 134, 136, 138 created by the undulating geometry of the first and second sealing regions 128, 130, the sealing regions 128, 130 must be properly angularly oriented relative to one another when the primary filter element 104 is mounted to the filter head 102. The ability to properly angularly orient the sealing regions 128, 130 will be discussed in more detail after more general discussion of the components of the filter system 100 are discussed.

Figure 4:
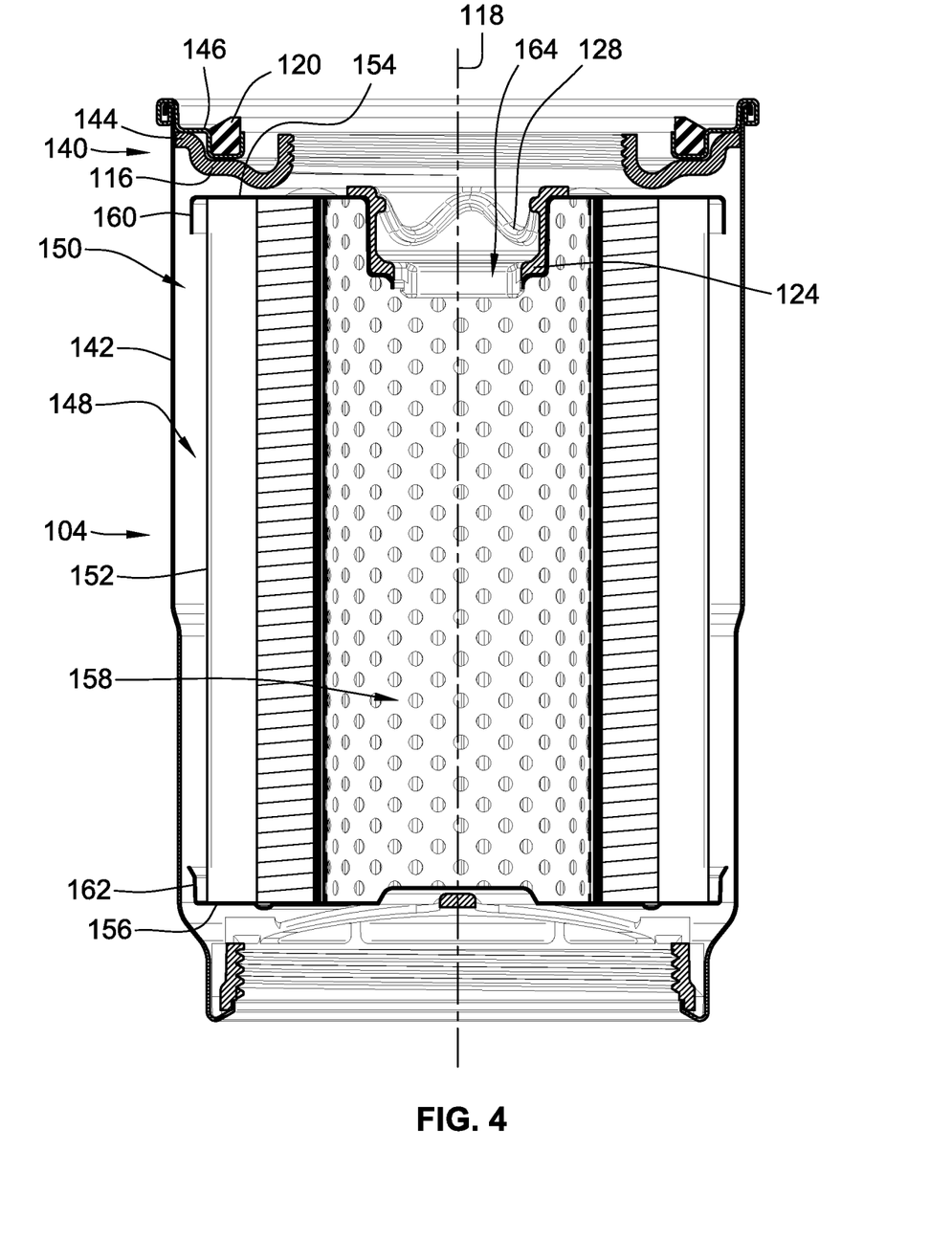
FIG. 4 is a cross-sectional illustration of the filter element of the filter system.

With reference to FIG. 4, the primary filter element 104 is illustrated in cross-section. The primary filter element 104 includes an outer housing 140 that is formed in part by the threaded attachment member 116 and an outer shell 142. The outer shell 142 is operably secured to the threaded attachment member 116 to angularly fix the two components to inhibit rotation of the threaded attachment member 116 relative to the outer shell 142 such that mounting and removal of the primary filter element 104 can be performed by operably gripping the outer shell 142 and applying an appropriate torque thereto. For example, a portion rim portion 144 of the threaded attachment member 116 may be crimped between a seal support plate 146 that supports first housing seal 120 and which is crimped to an end of an annular sidewall of the outer shell 142. Alternatively, the threaded attachment member 116 could be welded, adhesively secured or mechanically interlocked with either or both of the outer shell 142 or seal support plate 146.

The threaded attachment member 116 and outer shell 142 combine to define, at least in part, an internal shell cavity 148.

An element subassembly 150 (also referred to herein as "subassembly 150") is secured within the internal shell cavity 148. The subassembly 150 includes a tubular ring of filter media 152 (also referred to herein as "filter media 152") that extends axially between first and second ends 154, 156. The tubular ring of filter media 152 and surrounds an internal media cavity 158. The tubular ring of filter media 152 may be provided by pleated media and may have inner and outer wrappers for support and may also include a support core within the internal media cavity 158.

First and second end caps 160, 162 are attached to first and second ends 154, 156. The end caps 160, 162 that operably seal the first and second ends 154, 156. The first and second ends 154, 156 may be adhesively secured to the end caps 160, 162, the first and second ends 154, 156 of the filter media 152 may be operably embedded into the first and second end caps 160, 162 (e.g. if the end caps are plastic or formed from a polyurethane type material), or the end caps could be molded in plate such as from an appropriate plastic or polyurethane material.

In the illustrated embodiment, the first end cap 160 is annular and includes an opening that provides access therethrough to the internal media cavity 158. The seal member 124 is operably mounted in the opening in the first end cap 160. The seal member 124 also defines a central opening 164 that is in fluid communication with the internal media cavity 158. The seal member 124 is axially snap engaged to the first end cap 160 within the opening of the first end cap 160 by one or more radially extending projections that overlaps with a portion of the first end cap 160. The seal member 124 is sealed to the first end cap 160 to prevent fluid bypass between the seal member 124 and the first end cap 160. FIG. 4 also illustrates the first sealing region 128 and the repeating undulating geometry thereof.

With reference to FIG. 4, the central opening 164 is recessed axially into the outer shell 142 along axis 118 farther than the first seal region 128.

The threads of the threaded attachment member 116 are clearly illustrated in FIG. 4 as well.

Figure 8:
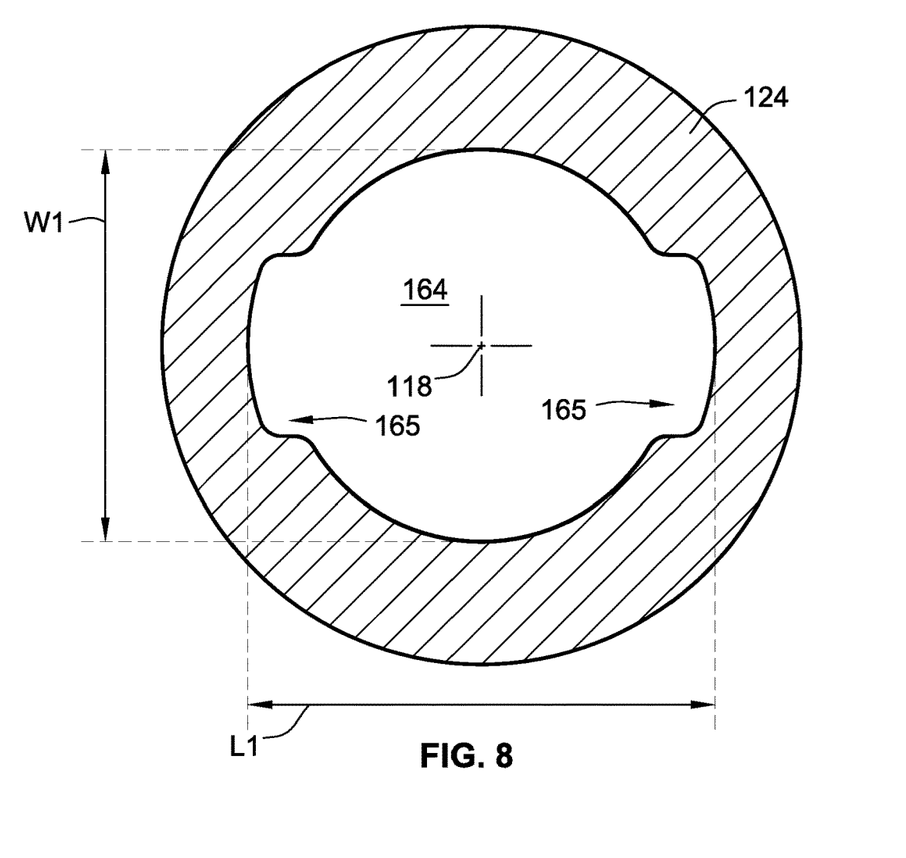
FIG. 8 is a cross-sectional illustration of the seal member of the filter element illustrating the cross-section of the opening into the internal cavity defined by the filter media.

With reference to FIGS. 3 and 8, the central opening 164 of the seal member 124 has a non-circular periphery. The non-circular periphery includes a pair of lobes 165 that provide the non-circular periphery. The non-circular periphery has a length L1 that is greater than a width W1 which is perpendicular to length L1. Both length L1 and width W1 are perpendicular to axis 118. This non-circular periphery corresponds to a similarly shaped portion of the spud 126 to angularly align the first and second seal regions 128, 130.

Figure 5:
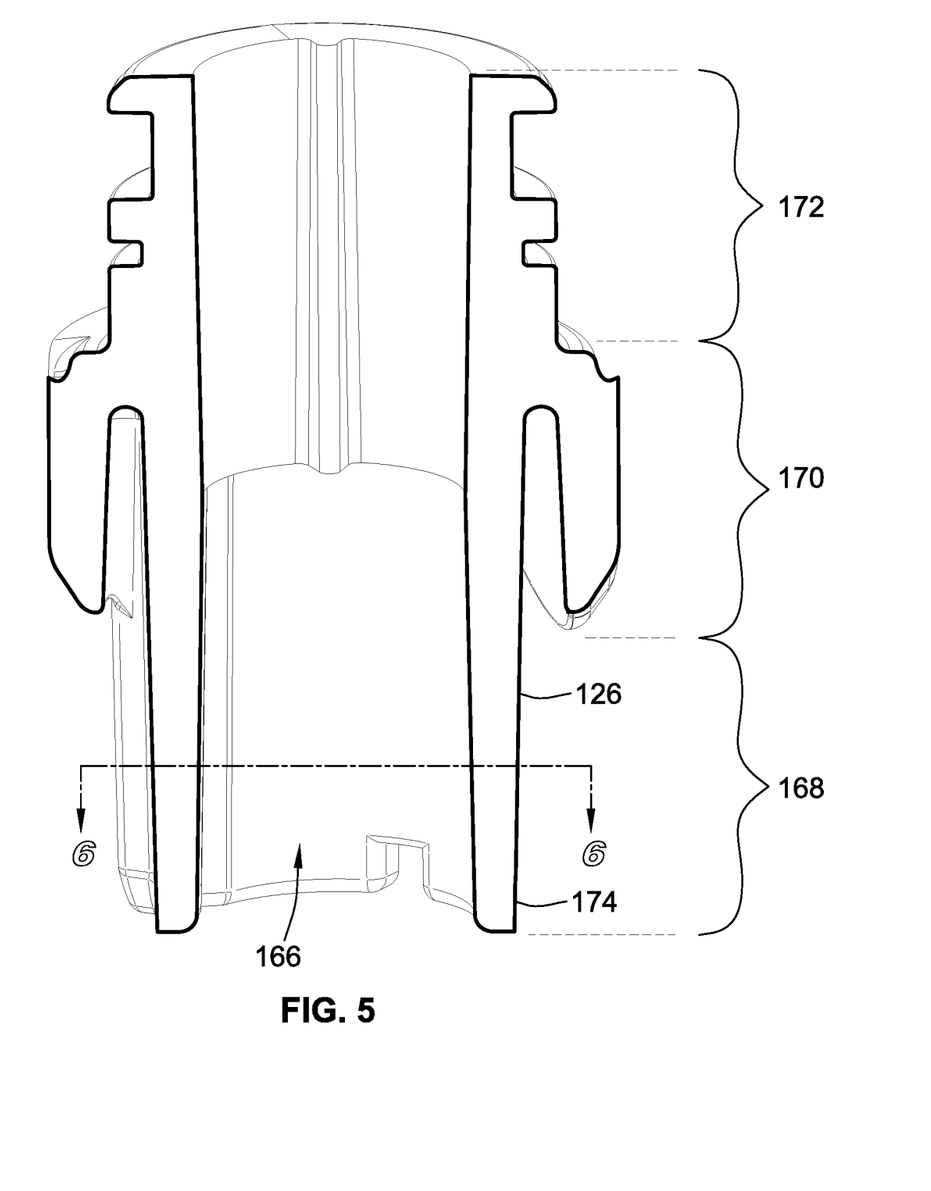
FIG. 5 is a cross-sectional illustration of the spud of the filter head.

With reference to FIGS. 3 and 5, the spud 126 is an axially extending member that defines a bore 166 that extends axially therethrough. The spud 126 includes a first axially extending portion 168, a second axially extending portion 170, and a third axially extending portion 172 that are axially offset from one another with the second portion positioned axially between the first and third portions.

Figure 6:
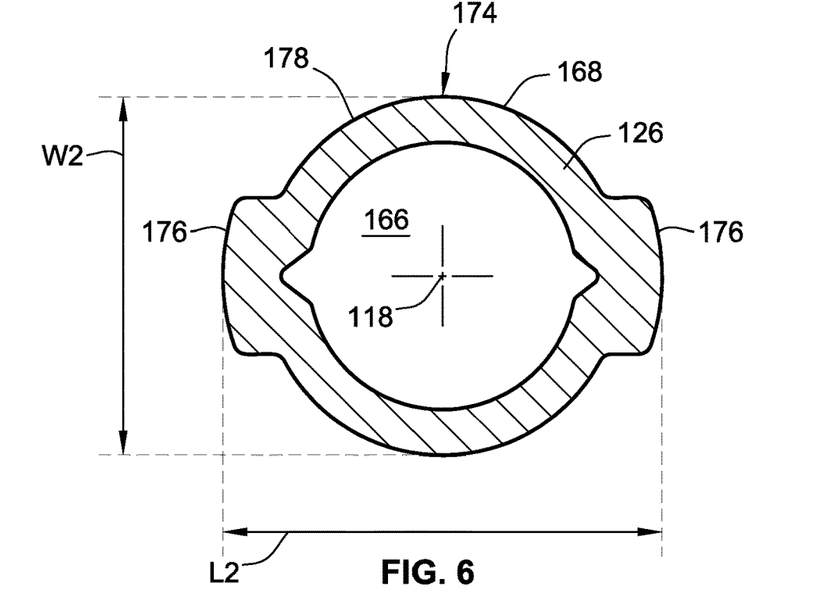
FIG. 6 is a cross-sectional illustration of the spud of FIG. 5.

With additional reference to FIG. 6, the first axially extending portion 168 defines a non-cylindrical outer surface 174. As used herein, non-cylindrical shall mean that it does not have a circular outer periphery when viewed in cross-section. The non-cylindrical outer surface 174 includes a pair of radially outward extending lobes 176 that extend from a generally cylindrical section 178. The cross-section of the non-cylindrical outer surface has a length L2 that is greater than a width W2, which is perpendicular to length L2. Both length L2 and width W2 are perpendicular to axis 118. The non-cylindrical outer surface 174 is used to angularly orient the spud 126 relative to seal member 124 such that the first and second seal regions 128, 130 align when the primary filter element 104 is mounted to the filter head 102. The length L2 generally corresponds to length L1 while width W2 corresponds to width W1 of opening 164 of the seal member 124 such that the two cross-sections generally correspond and mate with one another to properly angularly orient one another and such that torque may be transferred therebetween. While one particular shape is illustrated it is contemplated that other shapes could be provided. Further, the non-cylindrical outer surface could be provided by a plurality of features or shapes in order to create a custom profile for a particular application. For instance, different shapes or sizes could be used for filters for different systems to prevent use of an improper filter element.

With reference to FIG. 3, the second axially extending portion 170 defines the second seal region 130.

Figure 7:
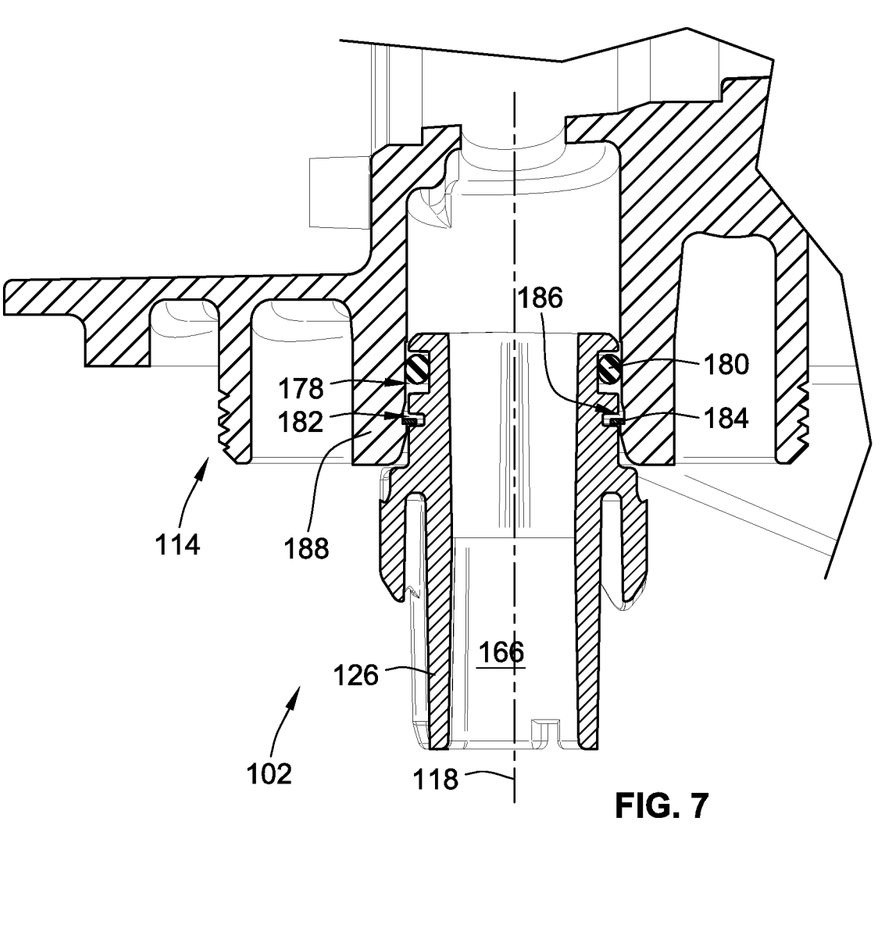
FIG. 7 is a cross-sectional illustration of the spud mounted to a body portion of the filter head.

With reference to FIGS. 3 and 7, the third axially extending portion 172 defines a mounting region that includes a first annular groove 178 that carries a seal member 180 illustrated in the form of an o-ring that seals the spud 126 to a body portion 188 of the filter head 102 and particularly the clean fluid port 112 thereof. The mounting region also includes a second annular groove 182 that carries a mounting ring 184 for axially securing the spud 126 to the rest of the filter head 102. The mounting ring 184 is received in another groove 186 formed in body portion 188 of the filter head 102. By providing this type of mounting of the spud 126, the spud 126 is free to rotate about axis 118 to assist in angularly aligning the first and second sealing regions 128, 130 when mounting the primary filter element 104 to the filter head 102. The spud 126 in this embodiment is free to rotate about axis 118 relative to the threaded filter mounting interface 114 of the filter head 102.

With reference to FIG. 2, when the primary filter element 104 is mounted to the filter head 102, the first axially extending portion 168 of spud 126 extends through central opening 164. This communicates the clean port 112 with the internal media cavity 158 of the filter media 152. Further, with the first axially extending portion 168 extending through central opening 164, the corresponding peripheral shapes of the two components (illustrated in FIGS. 6 and 8) cause proper angular alignment of the seal member 124 and spud 126 such that the corresponding first and second sealing regions 128, 130 are properly angularly aligned.

Figure 9:
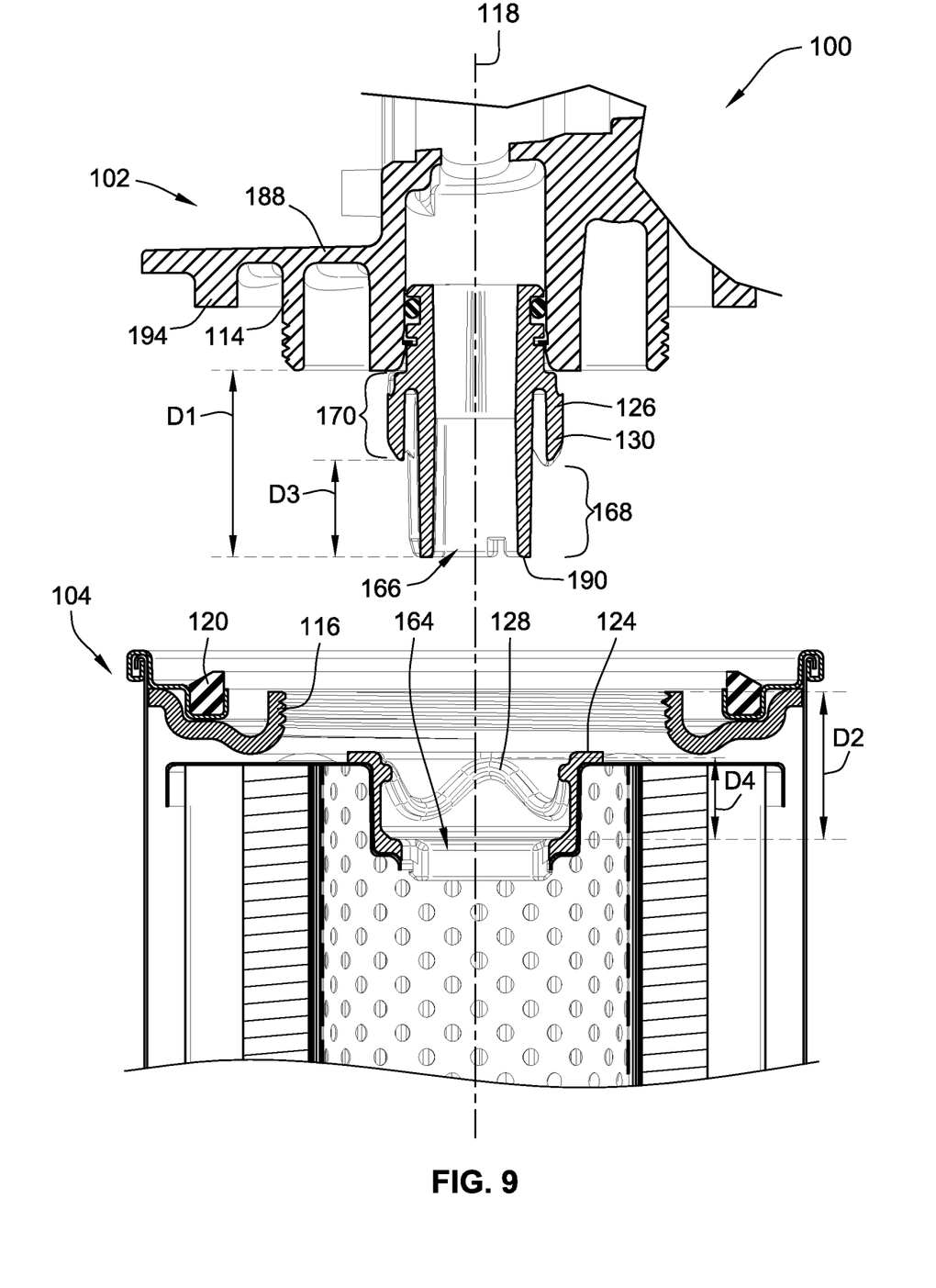
FIG. 9 is a cross-sectional illustration of the filter system prior to mounting the primary filter element to the filter head.

With reference to FIG. 9, the initial threads for mounting purposes of the threaded filter mounting interface 114 is spaced a first axial distance D1 from a distal end 190 of the spud 126 proximate/forming part of the first axially extending portion 168 with the non-cylindrical outer surface. The initial threads for mounting purposes of the threaded attachment member 116 are spaced a second axial distance D2 from the central opening 164. This allows the distal end 190 and the first axially extending portion 168 to be inserted into the central opening before the threads of the threaded filter mounting interface 114 and the threaded attachment member 116 engage during mounting purposes. As such, the user can properly angularly align the spud 126 with the seal member 124 and, thus, the corresponding first and second sealing regions 128, 130 prior to beginning threaded engagement between the threaded filter mounting interface 114 and threaded attachment member 116.

While not necessary, it is desireable that a third axial distance D3 between the second sealing region 130 and distal end 190 is greater than a fourth axial distance D4 between an axially outer side of the first sealing region 128 and the central opening 164. This allows the distal end 190 to be inserted into the central opening 164 prior to the first and second sealing regions 128, 130 coming into axial abutment/radial overlap. Again, this further facilitates angularly aligning the first and second sealing regions 128, 130 relative to axis 118.

With reference to FIG. 4, in some embodiments, the element subassembly 150 is rotatably carried within outer housing 140 as compared to threaded attachment member 116. More particularly, a greater amount of torque is required to rotate the threaded attachment member 116 relative outer shell 142 about axis 118 than is required to rotate the element subassembly 150 relative to the threaded attachment member 142. This allows the element subassembly 150 to rotate and further facilitate aligning the spud 126 with central opening 164. Further yet, if the spud 126 becomes fixed relative to body 188 of the filter head 102 and particularly the threaded filter mounting interface 114, the primary filter element 104 can still be rotated to engage the threaded filter mounting interface 114 with the threaded attachment member 116. This also provides another embodiment in which the spud 126 is not rotatably mounted to the body 188 and is fixed angularly about axis 118 relative to the threaded filter mounting interface 114. In this embodiment, the spud 126 and element subassembly 150 will remain in a fixed angular orientation with respect to the threaded filter mounting interface of the filter head 102 while the outer housing 104 (e.g. outer shell 142 and threaded attachment member 116) rotates about axis 118 when mounting or removing the primary filter element 104 from the threaded filter mounting interface 114.

In the illustrated embodiment, where the spud 126 is rotatably attached to body 188, the spud 126 will typically rotate with the primary filter element 104 as the primary filter element 104 is rotatably secured to the filter head 102. The spud 126 will rotate during mounting due to the angular engagement and torque transfer between the non-circular/non-cylindrical peripheries of the central opening 164 and first axially extending portion 168.

A method of mounting the primary filter element 104 to the filter head 102 will be described. First, the first axially extending portion 168 of the spud 126 will be angularly aligned with the central opening 164 such that the first axially extending portion 168 can be axially inserted into the central opening (e.g. the corresponding non-circular/non-cylindrical geometries will be angularly aligned). This will also angularly align the first and second sealing regions 128, 130.

Figure 10:
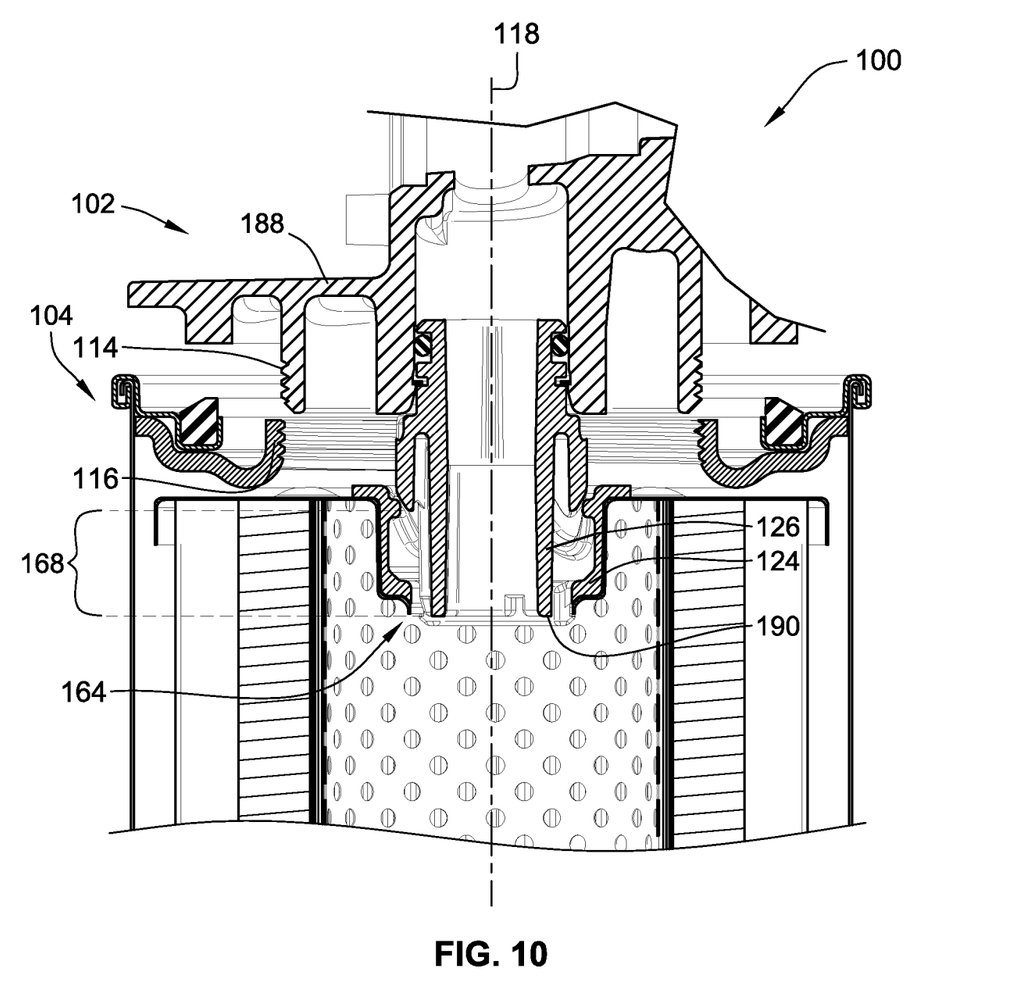
FIG. 10 is a cross-sectional illustration of the filter system after the spud has been inserted into the opening of the filter element prior to threadedly engaging the filter element to the filter head.

Thereafter/at substantially the same time, the first axially extending portion 168 of the spud 126 will be inserted axially into the central opening 164 until the initial threads of the threaded filter mounting interface 114 and threaded attachment member 116 axially abut (see e.g. FIG. 10).

The threads will then be rotatably engaged to attach the primary filter element 104 to the filter head 102 by rotating the outer housing 140 and particularly the threaded attachment member 116 relative to the threaded filter mounting interface. This will axially draw the primary filter element 104 towards the filter head 102. The primary filter element 104 will be rotated relative to the filter head 102 until it is properly axially seated relative to the filter head 102. This will occur when first housing seal 120 is properly axially compressed against a corresponding seal region 194 of the body 188. This will also ensure that the first and second sealing regions 128, 130 are properly radially engaged with one another to prevent fluid bypass between the seal member 124 and the spud 126.

Depending on the embodiment, rotating the outer housing 140 rotates the spud 126 relative to the threaded filter mounting interface 114, e.g. the embodiment where the spud 126 is rotatably mounted to body 188. Further, in some embodiments, rotating the outer housing 140 rotates the element subassembly 150 relative to the outer housing 140. This can be done by inhibiting rotation of the element subassembly 150 by angular engagement with an angularly fixed spud 126.

While the prior discussion was based on the primary filter element 104, the mounting of the secondary filter element 106 to the filter head 102 is similar to that of the primary filter element 104. More particularly, a similar spud, central opening and undulating seal arrangement may be included.

Further, other embodiments need not include both a primary and a secondary filter element, but only a single filter element.

Further yet, while the central opening and the non-circular geometry thereof is provided by the snap in seal member 124, other embodiments could have the non-circular opening through the end cap provided directly the end cap. In such an embodiment, the seal member would need to be properly angularly aligned relative to the non-circular profile of the central opening.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A filter system comprising:
   a filter head including:
      a first port and a second port;
      a threaded filter mounting interface that includes a mounting thread;
      an axially extending spud, the spud having a bore therethrough in operable fluid communication with the first port, the spud having a first axially extending portion defining a non-cylindrical outer surface, the spud having a second axially extending portion defining a first axially undulating and radially facing sealing region, the second axially extending portion being axially offset from the first axially extending portion;
   a spin-on filter element comprising:
      an outer housing including:
         an outer shell;
         a threaded attachment member secured to the outer shell, the threaded attachment member including a mounting thread that defines a rotational axis, the threaded attachment member and outer shell defining an internal shell cavity;
      an element subassembly secured within the internal shell cavity, the element subassembly including:
         a tubular ring of filter media extending between first and second ends and surrounding an internal media cavity;
         a first end cap attached to the first end,
         a central opening extending through the first end cap in fluid communication with the internal media cavity, the central opening defining a non-circular periphery, and
         a seal member attached to the first end cap and surrounding the central opening of the first end cap, the seal member having an axially undulating and radially facing sealing region;
   wherein:
      the first axially undulating and radially facing sealing region of the filter head engages the axially undulating and radially facing sealing region of the spin-on filter element;

the threaded attachment member threadedly engages the threaded filter mounting interface; and the first axially extending portion of the spud extends through the central opening of the element subassembly with the bore of the spud in fluid communication with the internal media cavity; and wherein the mounting thread of the threaded filter mounting interface is axially spaced relative to the first axially extending portion of the spud a first distance and the mounting thread of the threaded attachment member is axially spaced relative to the central opening of the element subassembly a second distance less than the first distance such that the first axially extending portion of the spud extends into the central opening before the mounting thread of the filter head engages the mounting thread of the spin-on filter element.

2. The filter system of claim 1, wherein the non-cylindrical outer surface of the spud cooperates with the non-circular periphery of the central opening such that insertion of the first axially extending portion of the spud into the central opening angularly aligns the first axially undulating and radially facing sealing region of the filter head with the axially undulating and radially facing sealing region of the spin-on filter element.

3. A method of mounting a spin-on filter element to a filter head, the filter head includes a threaded filter mounting interface that includes a mounting thread, an axially extending spud, the spud having a bore therethrough in operable fluid communication with a first port of the filter head, the spud having a first axially extending portion defining a non-cylindrical outer surface, the spud having a second axially extending portion defining a first axially undulating and radially facing sealing region, the second axially extending portion being axially offset from the first axially extending portion, the spin-on filter element includes an outer housing including an outer shell, a threaded attachment member secured to the outer shell, the threaded attachment member including a mounting thread that defines a rotational axis, the threaded attachment member and outer shell defining an internal shell cavity, an element subassembly secured within the internal shell cavity, the element subassembly includes a tubular ring of filter media extending between first and second ends and surrounding an internal media cavity, a first end cap attached to the first end, a central opening extending through the first end cap in fluid communication with the internal media cavity, the central opening defining a non-circular periphery, and a seal member attached to the first end cap and surrounding the central opening of the first end cap, the seal member having an axially undulating and radially facing sealing region, wherein the mounting thread of the threaded filter mounting interface is axially spaced relative to the first axially extending portion of the spud a first distance and the mounting thread of the threaded attachment member is axially spaced relative to the central opening of the element subassembly a second distance less than the first distance such that the first axially extending portion of the spud extends into the central opening before the mounting thread of the filter head engages the mounting thread of the spin-on filter element, the method comprising:

angularly aligning the first axially undulating and radially facing sealing region of the filter head with the axially undulating and radially facing sealing region of the spin-on filter element by inserting the first axially extending portion of the spud into the central opening with the non-cylindrical outer surface angularly oriented with the non-circular periphery of the central opening; and engaging the mounting thread of the spin-on filter element with the mounting thread of the filter head wherein the non-cylindrical outer surface of the first axially extending portion of the spud is axially inserted into the central opening and angularly aligned and engaged with the non-circular periphery of the central opening prior to the step of engaging the mounting thread of the spin-on filter element with the mounting thread of the filter head.

4. The method of claim 3, wherein:

engaging the mounting thread of the spin-on filter element with the mounting thread of the filter head includes rotating the outer housing of the spin-on filter element relative to the threaded filter mounting interface; and wherein rotating the outer housing rotates the spud relative to the threaded filter mounting interface.

5. The method of claim 3, wherein:

engaging the mounting thread of the spin-on filter element with the mounting thread of the filter head includes rotating the outer housing of the spin-on filter element relative to the threaded filter mounting interface; and further including preventing rotation of the element subassembly relative to the threaded filter mounting interface during the step of engaging by angularly engaging the spud with the central opening, the spud being angularly fixed relative to the threaded filter mounting interface.

6. The method of claim 3, wherein the spud is axially inserted into the central opening prior to the step of engaging the mounting thread of the spin-on filter element with the mounting thread of the filter head.

7. The method of claim 3, further comprising radially engaging the first axially undulating and radially facing sealing region of the filter head with the axially undulating and radially facing sealing region of the spin-on filter element to prevent fluid bypass between the spud and the seal member.

* * * * *